United States Patent [19]

McIntosh

[11] 3,728,679

[45] Apr. 17, 1973

[54] SKEW DEVICE

[75] Inventor: Billy L. McIntosh, Houston, Tex.

[73] Assignee: Weston Instruments Inc., Newark, N.J.

[22] Filed: Oct. 21, 1971

[21] Appl. No.: 191,324

[52] U.S. Cl. ........................340/146.1 F, 340/174.1 B

[51] Int. Cl. ........................G06k 5/04

[58] Field of Search ....................340/146.1 F, 174.1 B

[56] References Cited

UNITED STATES PATENTS

| | | | |
|---|---|---|---|
| 3,230,350 | 1/1966 | Mendelson et al. | 340/146.1 F |
| 3,325,794 | 6/1967 | Jenkins | 340/146.1 F |
| 3,427,591 | 2/1969 | Nishioka | 340/174.1 B |
| 3,562,723 | 2/1971 | Behr et al. | 340/174.1 B |
| 3,653,061 | 3/1972 | Frauenfelder et al. | 340/174.1 B |

*Primary Examiner*—Charles E. Atkinson
*Attorney*—William R. Sherman et al.

[57] ABSTRACT

A device for correcting the time relationship of parallel data bits to eliminate the effect of certain forms of static skew. The apparatus accepts the data bits on parallel channels, one of which is arbitrarily designated as the "master channel," the others being slave channels. Logic associated with the master channel generates an early gate signal upon arrival of a master channel data bit, and a late gate signal is generated, also as a result of the data bit arrival. An interval between the early gate and the late gate defines a "window" in time within which the apparatus produces a master channel data bit out, delayed by a predetermined amount, and within which the slave channel data bits should occur. If the slave channel data bits do not occur within this window, delay means in each slave channel is altered to readjust the occurence of the data bit out. Each slave channel is adjusted individually in accordance with the gate signal so that, after cyclic adjustment, the data bits are in essential coincidence. The interval between the early and late gate is adjustable by a sensitivity control to determine the accuracy of coincidence desired.

10 Claims, 8 Drawing Figures

INVENTOR
BILLY L. McINTOSH
BY Roylance, Abrams, Berdo & Kaul
ATTORNEYS.

INVENTOR
BILLY L. McINTOSH

BY Roylance, Abrams, Berdo & Kaul

ATTORNEYS.

INVENTOR
BILLY L. McINTOSH

BY Kaylance, Abrams, Berdo & Kaul
ATTORNEYS.

INVENTOR
BILLY L. McINTOSH
BY Roylance, Abrams, Berdo & Kaul
ATTORNEYS

INVENTOR
BILLY L. McINTOSH

BY Roylance, Abrams, Berdo & Kaul

ATTORNEYS.

INVENTOR
BILLY L. McINTOSH

BY Roylance, Abrams, Berdo & Kaul
ATTORNEYS.

SKEW DEVICE

This invention relates to skew correcting apparatus, and, more specifically, to means for correcting the time relationship of parallel data bits to correct for static skew.

A long-recognized problem in the data processing equipment is the existence of skew problems in parallel data channels. Various kinds of skew can exist in a tape system, some being attributable to displacement of the magnetic heads which read the data from the tape, some being attributable to stretch variations in the tape, and some being attributable to the angular relationship of the tape to the recording heads. The angular relationship of the tape to the heads, a form of static skew, introduces a relatively constant error, which error changes from time to time. Although the problem has been recognized before, there is no known apparatus which corrects for this kind of error without altering the tape reading equipment or the equipment to which the signals are transmitted.

An object of the present invention is to provide an apparatus for correcting for static skew errors in parallel data transmission.

A further object is to provide an apparatus which corrects the time relationship of data bits in parallel channels by introducing a fixed median delay and altering all channels until the bits are essentially time coincident.

A further object is to provide such a correction apparatus in which a variable and automatic sensitivity control is available, and in which an unlimited number of channels can be handled simply by duplicating the disclosed equipment.

A still further object is to provide an apparatus which requires no modification whatever to the record reading apparatus and does not require any special timing pulses along with the data so that no modification in the type of data recording is necessary. Further, no manual adjustments are necessary once the operation has been initiated, and changes in the static skew will be tracked automatically by the correction equipment.

Briefly described, the apparatus of the invention include means in a designated master channel for generating a delayed data bit output signal a predetermined time after the receipt of a master channel data bit input signal, means for generating signals defining an interval symmetrically located with respect to the delayed data bit output signal of the master channel, means in a designated slave channel for generating a delayed data bit output signal a predetermined time after the receipt of a data bit input signal in the slave channel, and means responsive to the existence of the slave channel data bit output signal outside of the interval to alter the predetermined delay in the slave channel for the next data bit output signal, thereby causing the slave channel data bit output to move toward coincidence with the master channel data bit output. Means is also provided for adjusting the time duration of the interval to adjust the sensitivity of the system.

It will be recognized that the system disclosed herein, while described in an environment of magnetic tape reading systems, is clearly applicable to any system in which data bits are transmitted in parallel and wherein errors in the time relationship between data bits is to be corrected. Thus, wide applicability exists for the system disclosed herein.

In order that the manner in which the foregoing and other objects are obtained in accordance with the invention can be understood in detail, a particularly advantageous embodiment thereof will be described with reference to the accompanying drawings, which form a part of this specification, and wherein.

Figure 1:
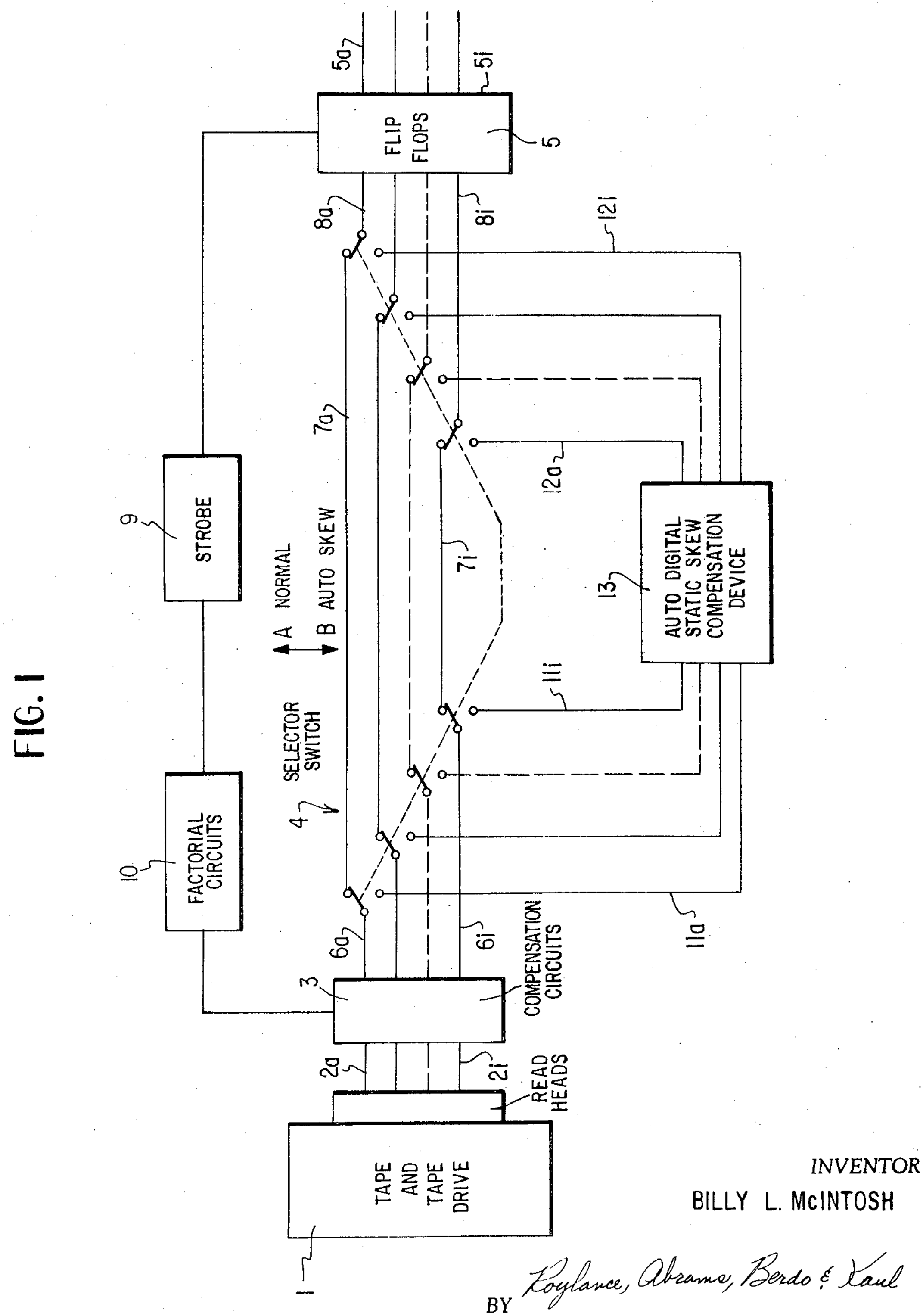
FIG. 1 is a block diagram of a parallel data transmission system from a tape reader showing the environment in which the present invention can operate.

FIG. 1 is a block diagram of a high density magnetic tape system of the type used to store and transfer digital data in a high capacity electronic data processing system. A tape machine 1 includes tape, tape drive and pick-up heads in a nine track, NRZI (non return to zero) system. Digital output signals from the nine heads are counducted through a group of paths 2*a–i* to the head compensation circuits 3. The head compensation circuits provide adjustments which permit individual compensation of the read heads for head skew.

With a selector switch shown generally as 4 in position A, output signals from the compensation circuits 3 are transferred to bi-stable circuits 5 through paths 6*a–i*, 7*a–i* and 8*a–i*. The signals, called data or data bits, from the read heads are held in temporary storage by the bi-stable circuits. It is a common practice in industry to hold the data information in temporary storage in the bi-stable circuits until time has elapsed so that the data signals from all nine tracks should have been received, at which time a common strobe signal 9, releases the data from the storage circuits. The strobe signal is generated by the factorial signal circuits 10 which in turn are connected to the compensating circuits 3.

An automatic digital static skew compensating device 13, the subject of the present invention, is inserted into the signal path when selector switch 4 is in the B position. That is, the individual data signals from the read heads are conducted through paths 6*a–i* to the selector switch 4, which in position B transfers the data to the input of the automatic skew device 13 through paths 11*a–i*. With the selector switch 4 still in position B the output of the automatic skew devices is transferred through path 12*a–i* to the input of the bi-stable circuits 5 through paths 8*a–i*.

The delay time between the data signals at the read heads 1 and the output of the flip flops 5, while in the non compensated mode, i.e., in position A of switch 4, is defined as zero delay. In the automatic compensating mode, i.e., switch 4 in position B, the delay between the signals at the read heads 1 and the bi-stable circuits 5 is approximately equal to one-half of one cell time. One cell time is the average time between data bits. It will be realized that the selector switch 4, which is shown schematically as a multi-section double-throw switch, will be replaced in practical hardware by a simple operator control switch and a group of logical AND and OR gates as will be described with reference to the detailed schematic.

Figure 2:
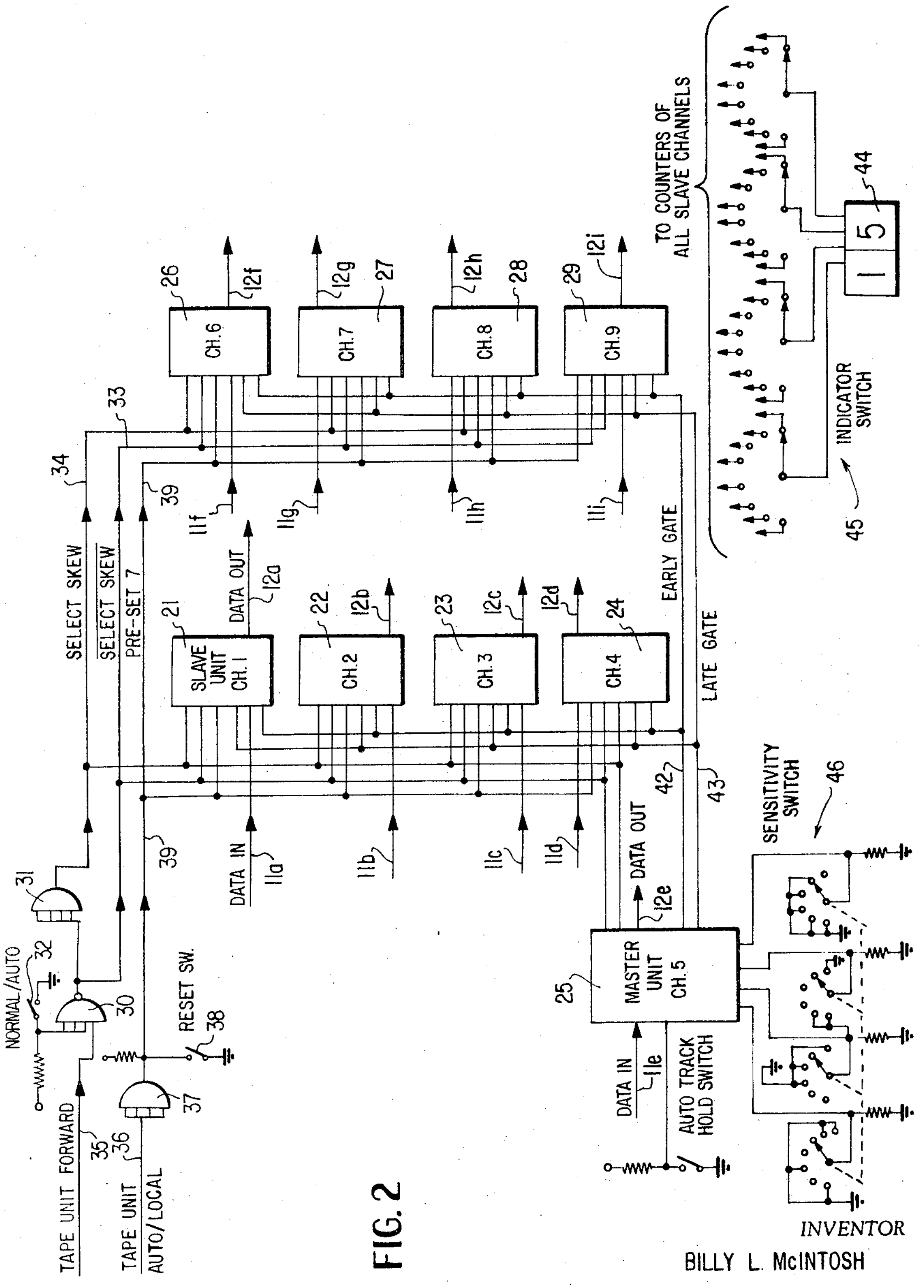
FIG. 2 is a block diagram of an automatic digital static skew compensation device in accordance with the invention.

FIG. 2 is a block diagram of the automatic digital static skew compensation device which shows the major components and signal paths of the device. The automatic skew device 13 as shown in FIG. 2 will handle nine channels of digital data from the tape drive, tape machine 1. The data in channels 1 through 4 and 6 through 9 are processed by slave units 21 through 24 and 26 through 29 respectively. The remaining channel of data is processed by the master unit, i.e., there is one channel of data selected, in this case channel 5, to which all other channels are slaved. Digital data signals from the read heads 1 and compensation circuits 3 are conducted to the slave and master channels through paths 11*a–i*. The output signals from the nine channels are conducted to the bi-stable circuits 5 through paths 12*a–i*. The on-off control of the automatic skew device, which will be referred to hereinafter as the normal/automatic control is controlled by two inverting gates 30 and 31. Thus, with the normal/automatic switch 32 in the normal or closed position, the output of inverter gate 30 is high and the signal select skew is transmitted to all nine channels via path 33. In this condition the master and all slave units are disabled and the input data on paths 11*a–i* is directly connected to the output data paths 12*a–i* without modification of the timing of the data signals. If switch 32 is in the automatic (or open) position, a select skew signal 34 becomes logic high through the action of gates 30 and 31. The application of this high logic signal 34 to all slave and master units turns on the automatic skew compensating function of the units. In this condition the output data signals from the master unit on path 12*e* are delayed approximately one-half cell length from the input data signal on path 11*e*. The output data signal from the eight slave units varies in timing in relation to the output data signals from the master unit because of the automatic operation of the slave units. Switch 32 and gates 30 and 31 perform the same function as switch A which is shown diagrammatically in FIG. 1.

A tape unit forward signal 35 is applied to one input of the invertor gate 30. The function of this signal is to permit automatic operation of the device only while the tape unit is in forward direction.

At the beginning of any tape run all eight slave units are preset to the same data signal delay as the data signal from the master unit. This is accomplished by application of an automatic/local signal 36 to gate 37. The signal on path 39 then becomes a logic low which resets all of the slave counters to seven. The closure of a reset switch 38 performs the same function and resets all slave counters to seven.

The relationship of the timing of the signals from the master unit to the timing of the signals from the slave channels will be described in considerable detail hereinafter. It is sufficient at this time to establish that the master unit 25 generates an early gate 40 and a late gate 41 which are used to establish the timing relationships of the slave units. The early gate and late gate are transmitted to the slave units on paths 42 and 43 respectively. It will be remembered that the output data bits from the master unit has a fixed delay of one-half cell time from the data bit input. The early gate is placed between the data bit in and the master unit data bit out while the late gate is placed between the master unit data bit out and the next succeeding data bit in. That is, the early gate starts with the receipt of the data bit in and ends before the master unit data bit out. The late gate starts sometime after the master unit data bit out and ends before the next succeeding data bit in. The width of these two gates affects the sensitivity of the automatic skew compensating device and is under the control of a sensitivity selector switch shown generally as 46. The selector switch 46 may be set from 1° to 5° of sensitivity. In the sixth position the sensitivity of the slave units, which is accomplished through the adjustment of the width of the early and late gates, is controlled by circuitry internal to the master unit 25. The delay between the data output pulse and the data input pulse of each slave unit is determined by a skew counter. The state of each skew counter may be read on a display 44 which is connected to the respective slave units through a channel selector switch shown generally as 45.

Figure 3:
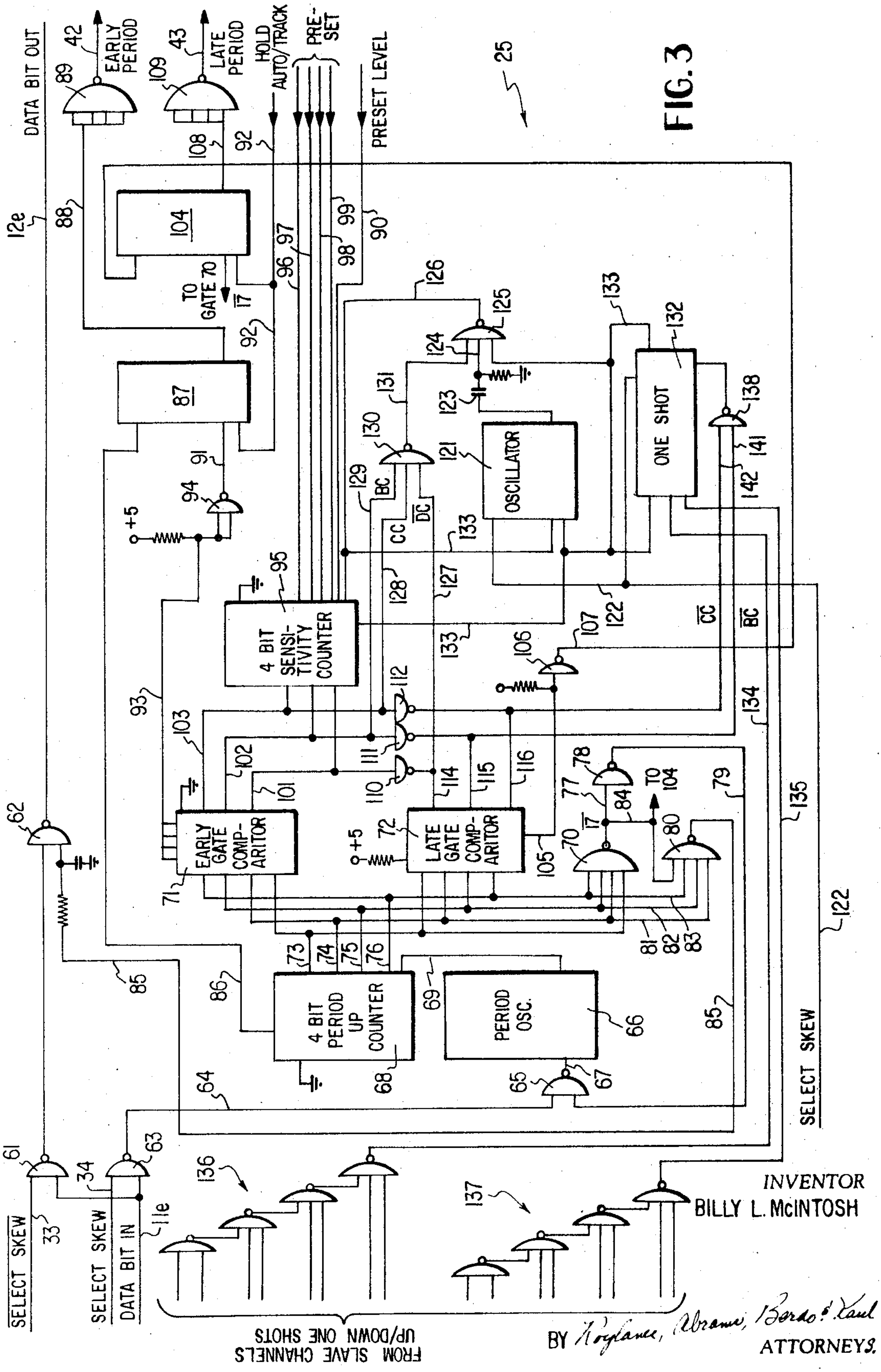
FIG. 3 is a schematic diagram of a master channel unit in accordance with the invention.

FIG. 3 is the schematic drawing of the master unit shown generally as 25. Signal paths into and out of the master unit were described in relation to FIG. 2. A select skew signal 33 places gates 61 and 62 in a condition to pass the data pulse signal on path 11*e*. As described previously, the data signals will then be transmitted by a path 12*e* to the bi-stable circuit shown in FIG. 1. This data signal, under these conditions, will be unmodified by the master unit. If the normal/automatic switch 32 is in the automatic position, the select skew signal received on path 34 enables gates 63. With gate 63 enabled the data pulse on line 11*e* will be transmitted to gate 65 on a path 64. The same data signal from gate 65 on path 67 releases the period oscillator 66. A 4-bit period up-counter 68, counts the output pulses of the period oscillator received on path 69.

The period counter 68 is wired to count in the octal base rather than the decimal base 10. The states of the four counting stages that form the period counter of the master unit represent the numerical count of the counter at any instant of time, in the form of digital signals, in the octal base. These states representing the count are transferred to a gate 70, an early period comparator 71, and a late period comparator 72 on paths 73,74,75 and 76. When all four signals on paths 73 through 76 are in the logic high condition, representing an octal 17, or a decimal 15, gate 70 is enabled transmitting a level via path 77, gate 78, path 79 and finally through gate 65 and path 67, turning off the period oscillator 66. Thus, in the process just described, the period oscillator 66 is turned on with the receipt of a data bit on path 64 and turned off upon receipt of a signal representing the 15th count of the period counter on path 79.

The frequency of the period oscillator 66 is advantageously chosen so that the time required for 15 pulses is approximately equal to 75 percent of one cell time. The time relationship of the data pulses and the operation of the period counter and the period oscillator will be discussed with reference to the timing diagram hereinafter. Counting states of 1,2 and 4 from the period up-counter are connected to a gate 80. Thus, when the three lines 81, 82 and 83 have a logic HIGH signal representing a count of seven signal gate 80 is enabled. Note, however, that the same three lines also have a logic HIGH when a decimal count of 15 or an octal count of 17 is received. It is therefore necessary to disable gate 80 with a $\overline{17}$ logic signal on path 84 in order to prevent enabling gate 80 during the 15th count from the period counter.

By the action of enabling gate 89 a pulse is transmitted through path 85 to gate 62. Thus, when the automatic digital static skew compensating device is in the automatic mode, and therefore a select skew signal is received on line 34, and by the action of the period oscillator 66 and the period counter 68, a data bit is transmitted through 85 and gate 62 to path **12*e* seven periods after a data bit is received on path 11*e***.

The early gate which is transmitted to the slave units via path 42 is initiated by the carry signal from the 4-bit period up-counter 68. The carry signal occurs just prior to initiating a new count. The carry signal which is transferred through a path 86 is used to set a bi-stable circuit 87. The output of the bi-stable circuit on path 88 is a logic low signal which is transmitted to the inverting gate 89 and finally to output line 42. The early gate is terminated by a reset pulse applied to the bi-stable circuit 87 via paths 91 and 93.

The signal on path 91 which resets bi-stable circuit 87, thus terminating the early gate, is generated by the comparator 71 whose output on path 93 is inverted by gate 94 thus resetting flip flop 87.

The signal generated by comparator 71, which turns off bi-stable circuit 87, is the result of comparing the count in the period of counter 68 with the count in the sensitivity correction counter 95. That is, when the count in counter 68 matches the count in counter 95, comparator 71 produces a pulse on path 93. As previously described, counter 68 counts from 1–15 pulses received from the period oscillator 66. The oscillator operation is initiated by the data pulse on line **11*e* and gate 65. Counter 68 is connected to the comparator 71 through paths 73 through 76** inclusive.

The sensitivity correction counter 95 is preset to any count from two to six, inclusive, by signals obtained through paths 96–99 from the sensitivity selector switch 46. The preset count number, represented by the states of the individual counting elements which make up the counter 95, in the form of an octal code, is transmitted to the comparator 71 through paths 101,102, and 103.

A preset level signal 90, obtained from the sensitivity switch 46, is a logic high-in the automatic correction position of the sensitivity switch. In all other positions of the switch 46, the preset level is low permitting the selection of the 1-, 2- and 4-bit levels to be enabled or disabled in accordance with the setting of the sensitivity switch.

The late gate is generated in a fashion very similar to the generation of the early gate. A signal generated by the late gate comparator 72 on path 105 via gate 106 and path 107 sets the bi-stable circuit 104. This produces a logical low on path 108 and through inverting gate 109 produces a logical high which is the beginning of the late gate. The late gate transmitted by a path 43 to all slave units. Bi-stable circuit 104 is reset, thus terminating the late gate, by a signal $\overline{17}$ which is received at the end of the 15th pulse from the up period counter 68. The bi-stable circuit can be terminated by a signal on path 92, obtained from the hold automatic track switch which will be described hereinafter. The signal from the comparator 72 which sets the bi-stable circuit 104 is the result of comparing the count from the period counter 68 with the complement of the count preset into the sensitivity counter 95. That is, the states of the elements which make up the sensitivity counter are transferred via paths 100, 102 and 103 to inverting gates 110, 111 and 112 and finally through paths 114, 115 and 116 to comparator 72. The operation of the comparator 72, the sensitivity counter 95, and the period counter 68 and oscillator 66, together with the associated late gate flip-flop 104 and inverting gates, is to produce a late gate which is initiated at some time after the delayed data pulse, which time depends upon the preset number in the sensitivity counter 95. The termination of the late gate is caused by period 15 from the period counter 68.

In the sixth position of the manual sensitivity selector switch 46 the sensitivity of the automatic digital static skew compensating device is under automatic or self-control by signals obtained from the slave stations. That is, the count which has been preset into the sensitivity counter 95 is automatically increased or decreased by examination of the skew required by the various slave units. A gated oscillator 121 produces pulses when gated on by the select skew applied through path 122. The gated pulses are applied through a condenser 123 through a path 124 and a gate 125 to path 126 and finally to the sensitivity correction counter 95. In response to a pulse from the gated oscillator 121 through gate 125 the preset count in the sensitivity counter will increase, thus increasing its sensitivity. Gate 130 which is connected to the sensitivity counter 95 through paths 127, 128 and 129 disables gate 125 via path 131 when the count in the sensitivity counter reaches six. Thus, by means of gate 130 the sensitivity counter is prohibited from exceeding a count of six.

The desensitizing of the correction counter 95 is accomplished by lowering the count. This reduction of count is achieved by inserting pulses from the one-shot multivibrator 132 through a path 133. The one-shot is triggered by pulses received through paths 134 and 135 from gates shown generally as 136 and 137 respectively. The inputs to gates 136 and 137 are obtained from the up-down, one-shot multivibrators in each of the eight slave units.

The one-shot multivibrator 132 is enabled by a select skew signal on path 122. To complete the logic paths for the automatic sensitivity circuits, gate 138 is connected via paths 141 and 142 to the sensitivity counter 95 and the output of the one-shot amplifier is connected via path 133 to the input logic of the oscillator 121. Details of the timing of the sensitivity circuits will be described in relation to the timing diagram hereinafter.

Figure 4:
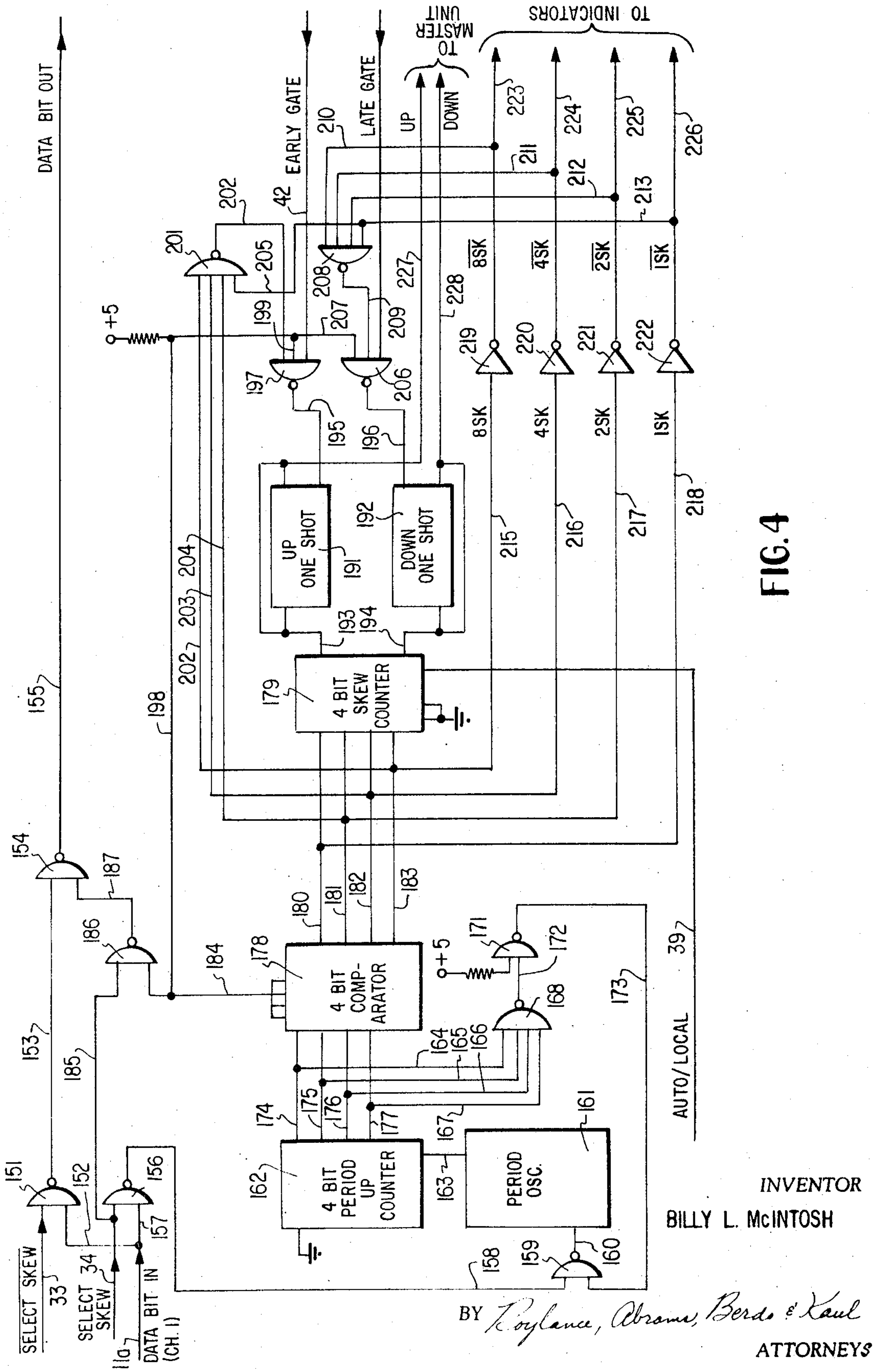
FIG. 4 is a schematic diagram of apparatus in a typical slave channel.

FIG. 4 is a schematic diagram which can be regarded as any one of the eight slave channels. The slave unit for channel 1 has been chosen by way of example, and the identifying numerals for that channel are used.

With reference to FIG. 4 the select skew signal, which is available either when the normal automatic switch is in the normal position or when the tape unit is in the reverse direction enables, gate 151 and a data pulse on path 152 will be transmitted via path 153 to a gate 154 and finally through a path 155 to the bi-stable circuit, i.e., flip-flop, shown generally as 5 in FIG. 1. Upon receipt of a select skew signal on path 34, a gate 156 is enabled and a data pulse on path 157 is transmitted via path 158 to gate 159.

The logic high signal from gate 159 on path 160 releases the gated oscillator 161 which then proceeds to produce pulses. The output pulses from the oscillator are transferred on a path 163 to a period counter 162. The 4-bit period up-counter 162 is wired to count from one to 17 in the octal base, which is the equivalent of one to 15 decimal base. The output states of the counting elements of the period counter are applied to gate 168 through paths 164 – 167. The output of gate 168 is connected to gate 171 through path 172 and through path 173 to gate 159. The states of the period counter 162 in cooperation with gates 168 and 171, are interconnected to recognize a count of decimal 15 which shuts off the gated oscillator 161 by way of gate 159.

A 4-bit up-down skew counter 179 is programmable and may be preset with any count from decimal zero to decimal 13. A signal received from the AUTO LOCAL switch, when in the LOCAL position, presets the skew counter 179, by the signal on path 39 to a seven count. The preset count in the skew counter 179 is transferred to the comparator 178 through paths 180 through 183. When the count in the period up-counter 162 equals the count in the preset skew counter 170, a pulse from comparator 178 appears on path 184.

The select skew signal on path 185 enables gate 186, thus transferring the pulse from the comparator 178 through path 184, gate 186, and path 187 to gate 154 and finally to path 155. Thus, when the skew counter 179 is preset with a count of seven, a data bit on path 65 will be transmitted to bi-stable circuits 5 as shown on FIG. 1, seven periods after the data bit is received by the slave unit on path 11*a*. A decrease in the count of the skew counter 179 results in a decrease in the delay between the input data pulse and the output data pulse, while an increase of the count of the skew counter results in an increase in the delay between the IN and OUT data bits.

As described with reference to the block diagram of FIG. 2, the reset switch 38 is used to preset all slave units to a skew count of seven. Changes in this preset count of seven are accomplished by the use of two one-shot multivibrators 191 and 192. Pulses from the one-shot 191 applied to the skew count of 179 on path 193 cause the skew counter to count up while pulses from the one-shot 192 on path 194 cause the skew counter 179 to count down. Thus, as a result of signals received on paths 195 and 196, the skew counter can be made to increase or decrease its count.

The instruction to the one-shot multivibrator 191 to increase its count via path 195 and gate 197 is dependent upon the coincidence of three signals. The first signal required for coincidence is the early gate which is received on path 42. The second signal is received from the comparator 178 which indicates that a comparison between the count of the period counter 162 and the skew counter 179 indicates coincidence has been achieved. This signal is inserted via paths 198 and 199. A third signal required for coincidence is that signal received on path 200 and is obtained from the output of the gate 201. The output high from gate 201 is obtained at all time except the count period octal 16 which is equivalent of a decimal 14. The inputs to gate 201 are obtained on path 202 through 204 and 226 from the skew counter 179.

In a similar fashion, the signal required by the one-shot amplifier 192 which causes the skew counter 179 to count down is the result of the coincidence of three signals at the input of gate 206. These inputs are, first, the receipt of the late gate via path 43. The second signal is obtained from the comparator on path 198, indicating that a comparison between the count in the period counter 162 has been made with the count in the skew counter 179, thus transmitting a pulse through path 207 to gate 206. The signal at path 209 from gate 208 is obtained during the time when the skew counter is not equal to an octal zero. The inputs to gate 208 are obtained through paths 210 through 213 from the skew counter 179. Note that through the use of inverting amplifiers 219–222 gate 208 receives the complement of the signals 215–218 from the skew counter 179. Outputs from the one-shots 191 and 192, which indicate whether the skew counter is to count up or count down, are conducted through paths 227 and 228, respectively, to the master unit.

As previously described, an indicator 44, which is connected to the individual slave units through the channel selector switch 45, indicates the states of the skew counters 179. It will be realized that skew counter 179 is representative of channel 1 while the display 44 indicates the status of the skew counters of all eight slave units depending upon the setting of the channel selector switch 45. The indicator 44 is connected to the respective slave units, i.e., the count states of the skew counters, which are connected to the amplifiers 219–222 via paths 215–218. The output from the amplifiers 219–222 are conducted through paths 223–226 to the selector switch 44 as shown in the block diagram FIG. 2.

In operation the circuits of the slave channel as shown in the schematic of FIG. 4 operate as follows. A data pulse received on line 11*a* in the normal mode is transmitted without delay to the bi-stable circuits 5 as shown in FIG. 1. In the automatic mode the data pulses received on path 11*a* are initially delayed by an amount equal to the delay in the data pulses of the master channel by setting a count of seven into the skew counter. From this time on, the delay of the data pulses from the slave units is dependent upon up-down compensating pulses set into the skew counter which correct for static skew of the tape in the tape system.

Figure 5:
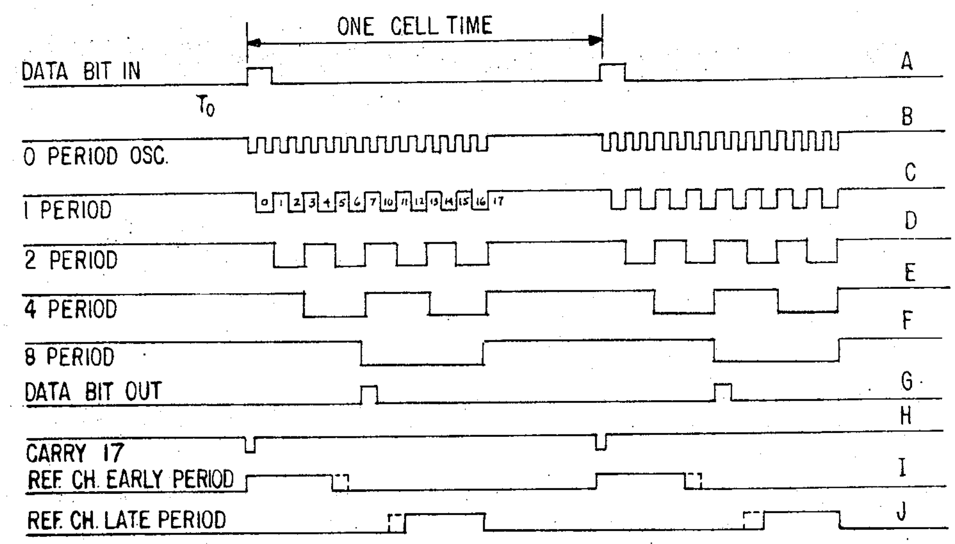
FIG. 5 is a timing diagram showing the time relationship between various signals in the apparatus of the invention.
Figure 6:
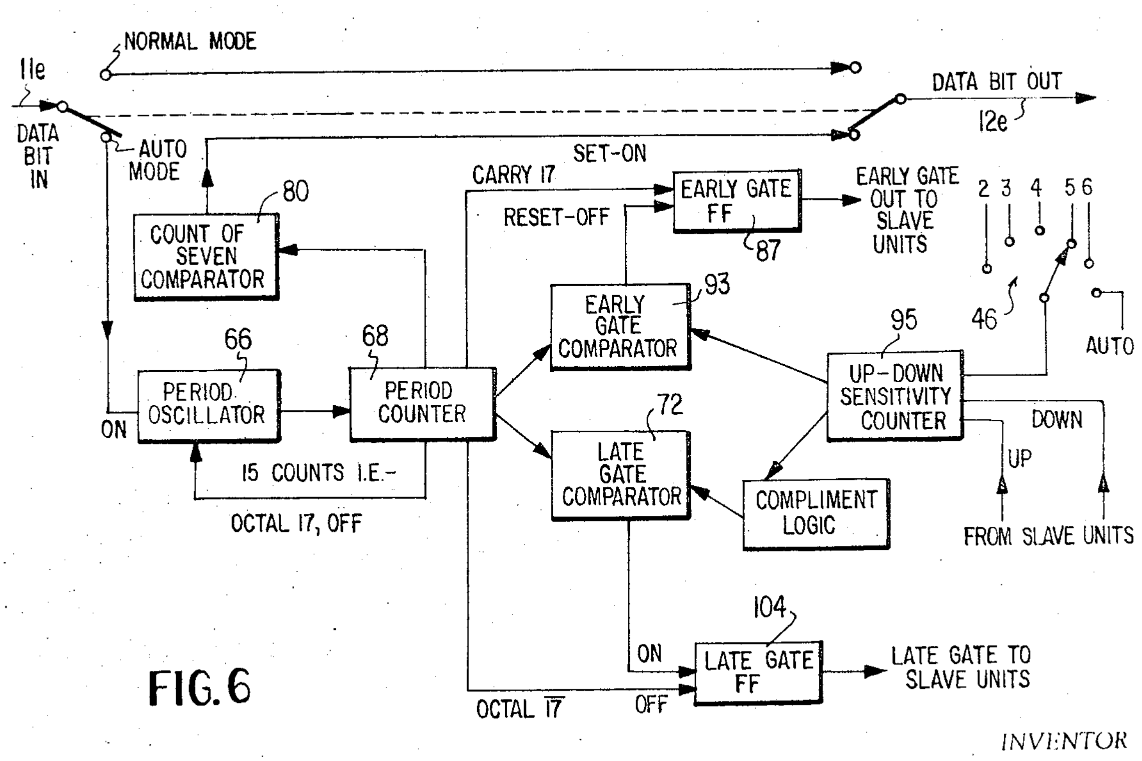
FIG. 6 is a simplified block diagram of the master channel unit, to be used in conjunction with the timing chart of FIG. 5.

FIG. 5 is a timing chart of the master unit 25 consisting of individual timing diagrams *a* – *j*. FIG. 6 is a simplified block diagram of the same master unit to be used in conjunction with the timing chart. Note that the numerals used to identify the major functions on the block diagram are the same as the numerals used for identical functions in the description of the detailed schematic of the master unit.

Line *a* of the timing chart of FIG. 5 shows 2 data bits as received by the master unit from the read heads compensating circuit 3 as described in relation to the block diagram of FIG. 1. The first data bit shown is received at time $T_0$ while the second data bit is received one cell time later. As shown in FIG. 6 the data bits are received at the master unit on line 11*e* and in the normal mode are transmitted to the output line 12*e* without delay or other modification. In the automatic mode the data bits are applied to the period oscillator 66.

Line *b* of the timing chart of FIG. 5 shows the output pulses from the period oscillator 66 as they are applied to the period counter 68. After 15 pulses are counted by the period counter a signal identified as octal 17 is transmitted to the period oscillator which gates it off. Note that the frequency of the period oscillator has been chosen so that 15 pulses are produced in approximately 75 percent of one cell time.

Lines *c*, *d*, *e* and *f* of the timing chart in FIG. 5 show the output of the four timing elements which make up the period counter. Thus, these four lines, *c*, *d*, *e* and *f* are identified as the one period, two period, four period and eight period, representing the four states of the binary counter. The first three states, the one, two and four periods, are recombined in the count of seven. The period oscillator 66, period counter 68, and count of seven comparator 80, cooperate to release a data bit out on line 12*e* seven pulses after a data bit in is received at the input line 11*e*. The timing of this data bit out in its relationship to the other wave forms of the master channel is shown on line *g* of the timing chart of FIG. 5.

The early gate which is supplied to all eight of the slave units is formed by the action of the bi-stable circuit 87 which is set by a carry 17 signal from the period counter. As shown in the timing chart of FIG. 5 line *h*, the carry 17 signal, which is also decimal 15, occurs immediately after $T_0$. Thus, the beginning of the early gate as shown in line *i* of the timing chart, coincides with the beginning of the carry 17 signal.

The early gate is turned off by resetting the early gate bi-stable circuit 87. The reset signal is obtained from the early gate comparator 93. The early gate comparator functions to compare the count in the period counter 68 with the count which is preset into the sensitivity counter 95. That is, if the sensitivity selector switch 86 has, for example, been set to a sensitivity of five the up-down sensitivity counter 95 will be reset with a count of five. When the period counter reaches a count of five the early gate comparator 93 releases a pulse which resets the early gate bi-stable circuit 7. In timing diagram *i* of FIG. 5, the solid line shows the early gate being shut off, i.e., bi-stable circuit 87 being reset at the end of the count period five. The dotted line of the timing diagram *i* shows the early gate being extended by one period, i.e., the dotted line shows the early gate as it would be with the sensitivity switch 46 in the sixth position, and the up-down sensitivity counter 95 with a preset count of six.

The late gate is generated by bi-stable circuit 104 and transmitted to all eight slave units. The bi-stable circuit is set, i.e., turned on, by a signal from the late gate comparator 72. The comparator functions to compare the signal of the period counter 68 with the preset count in the up-down sensitivity counter 95. As described in relation to the early gate the number in the sensitivity counter is determined by the sensitivity of the sensitivity switch 46, which in the example described, sets the counter to five. In the case of the late gate circuitry. The late gate comparator is connected to the sensitivity counter through complementary logic. That is, the comparator will see the complement of the count number preset into the sensitivity counter. The sensitivity counter has a maximum count of 15 and therefore, in the example described, with the counter preset to the number 5, the late gate comparator will receive through the complementary logic the number $15 - 5 = 10$, in the decimal base.

In operation, the late gate comparator 72 will function to turn on the late gate bi-stable circuit 104 when the period counter has reached the complement of the number preset into the sensitivity counter 95. The late gate bi-stable circuit is turned off at the end of the 15th period (octal $\overline{17}$) received from the period counter 68. With the sensitivity selector switch 44 set in the fifth position, for example, the wave form of the late gate will be as shown by the solid line in the timing diagram *j* of FIG. 5. The dotted line of the same timing diagram shows that the extension of the late gate which would occur with the sensitivity selector switch 46 set in the sixth position. In this case, the late gate would start with the ninth period (obtained by subtracting 6 from 15 which is 9, the complement of 6).

In the process just described, the master unit has created a slot formed by the end of the early gate and the beginning of the late gate, the reference data bit from the master unit being constantly located in the center of the slot. The width of the slot is determined by the setting of the sensitivity control 46 or is under automatic control from signals received from the slave units. By action of the automatic digital skew compensating device, any tape skew caused by the tape unit will be automatically compensated and the data bits out of the slave channels will be timed to fall within the variable width slot formed by the master unit.

Figure 7:
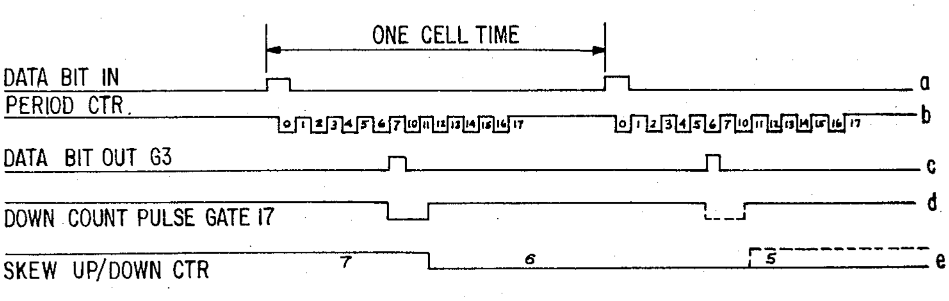
FIG. 7 is a timing diagram showing the relationship of signals in a slave unit.
Figure 8:
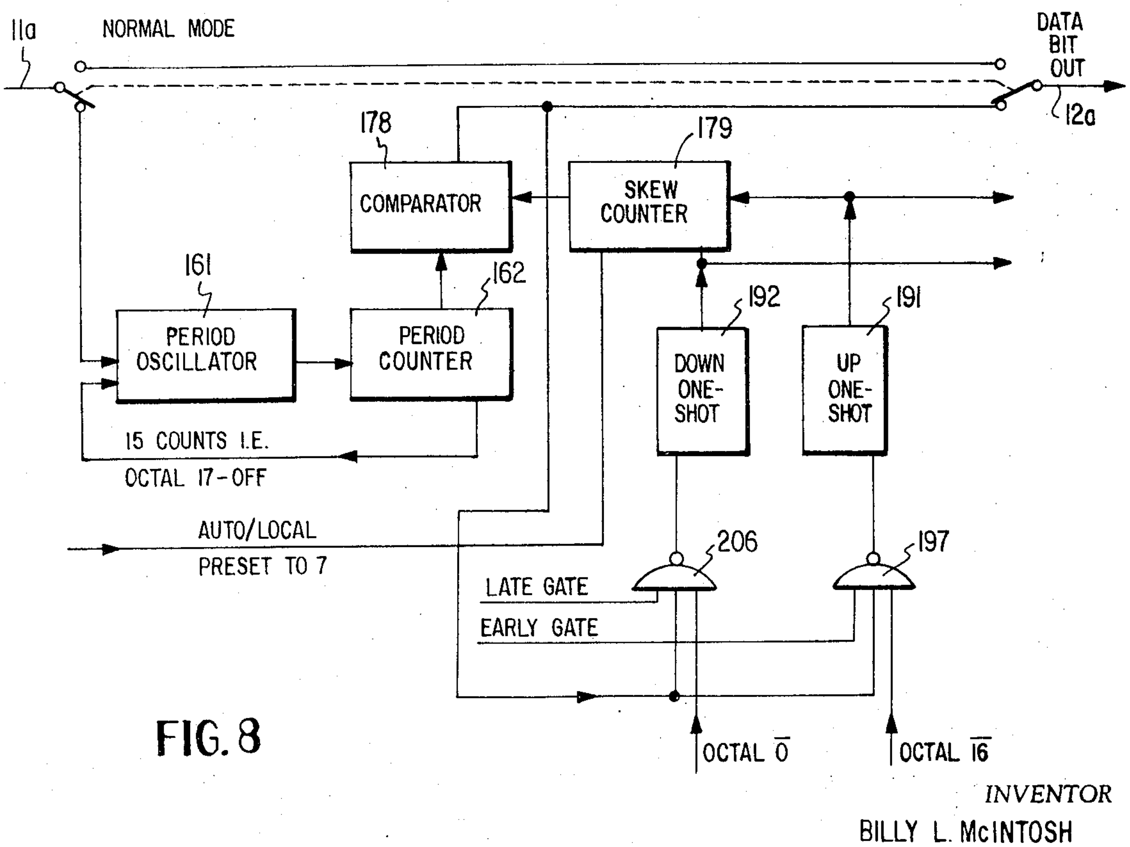
FIG. 8 is a simplified block diagram of a slave unit, this diagram to be used in conjunction with the timing chart of FIG. 7.

FIG. 7 is a timing chart of the slave unit 21 consisting of individual timing diagrams A through E. FIG. 8 is a simplified block diagram of the same slave units to be used in conjunction with the timing chart. Note also that although the timing and block diagrams represent any one of the eight slave units the input and output signals as described with reference to the block diagram represents the slave unit for channel 1 which has been chosen by way of example.

Line A of the timing chart of FIG. 7 shows 2 data bits as received by the slave unit from the read heads compensating circuit 3 as described in relation to the block diagram of FIG. 1. The first data bit shown is received at time $T_0$ while the second bit is received one cell time later. It should be noted that key $T_0$ is defined relative to the slave unit and does not necessarily correspond to $T_0$ of the master unit. As shown in FIG. 8 the data bits are received on line A and in the normal mode are transmitted to the output lines 12*a* without delay or other modification. In the automatic mode the data bits are applied to the period oscillator 161, which gates the oscillator on.

Line B of the timing chart of FIG. 7 shows the output pulses from the period oscillator 161 as they are applied to the period counter 162. After 15 pulses are counted by the period counter 162, a signal identified as octal 17 is transmitted to the period oscillator which gates it off. Note that the frequency of the period oscillator has been chosen so that 15 pulses are produced in approximately 75 percent of one cell time.

With the automatic/local switch in the automatic position a signal will be received by the skew counter 179 which will preset it to a count of seven. When the count of seven in the skew counter is matched by the count of the period counter 162 a signal will be generated by the comparator 178 and transmitted as a data bit out on line 12*a*. The timing of this data bit out is shown on line C of the timing diagram of FIG. 7. Thus, the setting of the skew counter determines the amount of delay between the data bit in and the data bit out. For example, if the skew counter is set at octal 2 there would be less delay than if it was set at octal 13. It will be realized that octal 2 is equivalent to decimal 2 and that octal 13 is equivalent to decimal 11.

The skew counter 179 will count up from its preset number seven in accordance with instructions received from the one-shot multivibrator 191 and will count down from the preset number seven in response to instructions received from the one-shot multivibrator 192. Thus, the delay between the data bit in and the data bit out can be increased by signals from multivibrator 191 and decreased by signals from multivibrator 192. The multivibrator 191 is in turn pulsed by a signal from the three input AND gate 197. The AND gate 197 is enabled only when three signals are received in coincidence. These three signals are: first, the early gate from the master unit; second, an octal 16 signal from the skew counter 179; and third, a logic HIGH signal from comparator 178. With the coincidence of these three signals a pulse will be transmitted to the multivibrator 191 and in turn a pulse will cause the skew counter 179 to count up by one count, thus increasing the delay between the data bit in and the data bit out.

In a generally similar fashion the AND 206 controls the multivibrator 192 which causes the skew counter 179 to count down. In the case of the AND gate 206, the three signals required for coincidence are the late gate from the master unit, an octal $\overline{0}$ from the skew counter 179 and lastly, a logic HIGH signal from the comparator 178. Note also that the output of both the up multivibrator 191 and the down multivibrator 192 are transmitted to the master unit for use in the circuitry of the automatic sensitivity control.

Note in particular that the action of the circuits just described is always in the direction to change the delay of the data bits out to more nearly coincide with the data bits out of the master channel. The up and down multivibrators each have two additional functions. One, they standardize the count pulses so that the skew counter 179 will always count properly and second, they delay the changing of the count of the skew counter until the period counter has had sufficient opportunity to complete the previous count. This effectively eliminates multiple data pulses out.

While one advantageous embodiment has been chosen to illustrate the invention it will be understood by those skilled in the art that various changes and modifications can be made therein without departing from the scope of the invention as defined in the appended claims.

What is claimed is:

1. An apparatus for adjusting the time relationship between data bits in plural channels in a communications system of the type having at least two channels for the parallel transmission of the data bits and wherein one channel is designated as a master channel and each other channel is a slave channel, the apparatus comprising the combination of means in the master channel for generating a delayed data bit output signal a predetermined time after receipt of a data bit input signal; means responsive to a signal from the master channel for generating signals defining an interval symmetrically located about the data bit output signal of the master unit; means in the slave channel for generating a delayed data bit output signal a predetermined time after receipt of a data bit input signal; means responsive to said means for generating signals defining an interval for determining the existence of said slave channel data bit output signal outside of said interval for generating a control signal indicative of said existence and means responsive to said control signal for altering said predetermined delay in the slave channel for the next data bit output signal.

2. An apparatus according to claim 1 and wherein said means for generating signals defining an interval further comprises means for adjusting the time duration of said interval to adjust the sensitivity of said means for altering said predetermined delay in the slave channel.

3. An apparatus according to claim 1 wherein said means for generating signals defining an interval further comprises means for adjusting the time duration of said interval to adjust the sensitivity of said means for altering said predetermined delay in the slave channel and means responsive to said control signal from said means for altering said predetermined delay in the slave channel for automatically adjusting the duration of said interval.

4. An apparatus for adjusting the time relationship between data bits in plural channels in a communications system of the type having at least two channels for the parallel transmission of the data bits and wherein one channel is designated as a master channel and each other channel is a slave channel, the apparatus comprising the combination of means in the master channel for generating a delayed data bit output signal a predetermined time after receipt of a data bit input signal; means responsive to a signal from the master channel for generating an early gate signal having a trailing edge; means responsive to a signal from the master channel for generating a late gate signal having a leading edge spaced in time after said trailing edge; means in said slave channel for generating a delayed data bit output signal a predetermined time after receipt of a data bit input signal; means in the slave channel responsive to said trailing and leading edges of said early and late gate signals, respectively, for defining an interval within which the delayed data bit output signal from said slave channel is to be produced to be in substantial time coincidence with the delayed data bit in said master channel; means responsive to said means for defining an interval for determining the existence of said slave channel data bit output signal outside of said interval for generating a control signal indicative of said existence and means responsive to said control signal for altering said predetermined delay in said slave channel for the next data bit output signal.

5. An apparatus according to claim 4 and further comprising means for adjusting the time spacing between said trailing edge and said leading edge to adjust the sensitivity of said means in said slave channel.

6. An apparatus according to claim 5 and further comprising means responsive to signals from said means for altering said predetermined delay in said slave channel for automatically adjusting the duration of said early and late gate signals.

7. An apparatus according to claim 4 wherein said means in the master channel includes an oscillator; a counter connected to count output signals from said oscillator commencing with the arrival of said data bit input signal; and a comparator for generating a delayed data bit output signal when said counter reaches a predetermined count.

8. An apparatus according to claim 7 wherein said means for generating an early gate signal includes a bi-stable circuit responsive to the arrival of a data bit input signal on said master channel to initiate said early gate signal; a second comparator connected to said counter; means for providing a predetermined input to said comparator, said comparator being operative to trigger said bi-stable circuit to terminate said early gate signal when the count in said counter equals said predetermined input.

9. An apparatus according to claim 8 wherein said predetermined input is changeable to alter the duration of said early gate.

10. An apparatus according to claim 8 wherein said means for generating a late gate signal includes a third comparator circuit connected to said counter; means for providing the complement of said predetermined input to said third comparator, a bi-stable circuit responsive to the arrival of the count in said counter at a level of said complement input to initiate generation of said late gate signal, said bi-stable circuit being responsive to the arrival of said counter at a second predetermined count to terminate said late gate.

* * * * *